(12) United States Patent
Kazakov et al.

(10) Patent No.: US 10,783,694 B2
(45) Date of Patent: Sep. 22, 2020

(54) TEXTURE RESIDENCY CHECKS USING COMPRESSION METADATA

(71) Applicant: Advanced Micro Devices, Inc., Sunnyvale, CA (US)

(72) Inventors: Maxim V. Kazakov, San Diego, CA (US); Skyler J. Saleh, San Diego, CA (US); Ruijin Wu, San Diego, CA (US); Sagar Shankar Bhandare, San Diego, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/687,108

(22) Filed: Aug. 25, 2017

(65) Prior Publication Data

US 2019/0066352 A1 Feb. 28, 2019

(51) Int. Cl.

| | |
|---|---|
| *G06T 15/00* | (2011.01) |
| *G06T 15/04* | (2011.01) |
| *G06T 15/80* | (2011.01) |
| *G06T 9/00* | (2006.01) |
| *G06T 1/60* | (2006.01) |
| *G06T 17/20* | (2006.01) |

(52) U.S. Cl.
CPC .............. *G06T 15/005* (2013.01); *G06T 1/60* (2013.01); *G06T 9/00* (2013.01); *G06T 15/04* (2013.01); *G06T 15/80* (2013.01); *G06T 17/20* (2013.01)

(58) Field of Classification Search
CPC ......... G06T 9/00; G06T 11/001; G06T 11/40; G06T 15/005; G06T 15/04; G06T 15/80; G06T 17/20; G09G 5/363

USPC .......................................................... 345/426
See application file for complete search history.

(56) References Cited

U.S. PATENT DOCUMENTS

| | | | |
|---|---|---|---|
| 6,339,428 B1 * | 1/2002 | Fowler | G06T 15/04 345/582 |
| 7,948,498 B1 | 5/2011 | Minkin | |
| 2008/0204451 A1 * | 8/2008 | Im | G06T 1/60 345/419 |
| 2012/0038657 A1 | 2/2012 | Grossman et al. | |
| 2013/0328895 A1 * | 12/2013 | Sellers | G06T 1/00 345/522 |
| 2015/0097851 A1 * | 4/2015 | Anderson | G06T 1/60 345/552 |

(Continued)

OTHER PUBLICATIONS

International Search Report and Written Opinion dated Nov. 27, 2018 for Application No. PCT/US2018/047539, 13 pages.

(Continued)

*Primary Examiner* — Michelle Chin (57) ABSTRACT

A pipeline is configured to access a memory that stores a texture block and metadata that encodes compression parameters of the texture block and a residency status of the texture block. A processor requests access to the metadata in conjunction with requesting data in the texture block to perform a shading operation. The pipeline selectively returns the data in the texture block to the processor depending on whether the metadata indicates that the texture block is resident in the memory. A cache can also be included to store a copy of the metadata that encodes the compression parameters of the texture block. The residency status and the metadata stored in the cache can be modified in response to requests to access the metadata stored in the cache.

20 Claims, 9 Drawing Sheets

(56) References Cited

U.S. PATENT DOCUMENTS

| | | |
|---|---|---|
| 2015/0187089 A1 | 7/2015 | Neyman et al. |
| 2016/0071232 A1 | 3/2016 | Goodman et al. |
| 2016/0078665 A1* | 3/2016 | Kwon ..................... G06T 9/00 345/426 |
| 2016/0300320 A1 | 10/2016 | Iourcha et al. |

OTHER PUBLICATIONS

International Preliminary Report on Patentability dated Mar. 5, 2020 for International Application No. PCT/US2018/047539, 12 pages.

* cited by examiner

TEXTURE RESIDENCY CHECKS USING COMPRESSION METADATA

BACKGROUND

A graphics processing unit (GPU) typically processes three-dimensional (3-D) graphics using a graphics pipeline formed of a sequence of programmable shaders and fixed-function hardware blocks. For example, a 3-D model of an object that is visible in a frame can be represented by a set of triangles, other polygons, or patches which are processed in the graphics pipeline to produce values of pixels for display to a user. The triangles, other polygons, or patches are collectively referred to as primitives. The process includes mapping textures to the primitives to incorporate visual details that have a higher resolution than the resolution of the primitives. The GPU includes a dedicated memory that is used to store texture values so that the texture values are available for mapping to primitives that are being processed in the graphics pipeline. Textures can be stored on a disk or procedurally generated as they are needed by the graphics pipeline. The texture data stored in the dedicated GPU memory is populated by loading the texture from the disk or procedurally generating the data. The dedicated GPU memory is typically a relatively small memory, which limits the amount of texture data that can be stored in the dedicated GPU memory. Furthermore, the overhead required to populate the texture data can be significant, particularly if only a small subset of the texture data is used to render the final screen image. For example, textures are loaded from disk on a page-by-page basis even if only a small portion of the data in the page is used to render the image.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Space in the dedicated GPU memory can be conserved by populating a subset of a texture and using a residency structure to indicate the portions of the texture that are resident in the memory. The residency structure can then be queried before accessing the texture data to ensure that the texture data is resident in the dedicated GPU memory. Thus, the GPU is only required to populate portions of the texture that are not already resident in the dedicated GPU memory in response to requests to access texture data. Implementing a residency structure can therefore improve performance by removing the need to fully populate each texture stored in the dedicated GPU memory. However, hardware accelerated residency checks are implemented using virtual memory address translation tables so the granularity of the residence check is determined by granularity of the virtual memory pages, which is typically 64 kB. Only a small portion of the texture data in each virtual memory page is typically used by the graphics pipeline, which results in hardware accelerated residency checks incurring a large overhead to populate the texture data in each virtual memory page. Software-based residency checks can implement arbitrarily small granularities, but applications that implement software-based residency checks must perform a traversal of the residency structure (which includes at least one command/response exchange between the application and the residency structure) for every texture sampling operation. Thus, a software-based residency check could be required to traverse the residency structure for every rendered pixel, which would reduce the performance of the graphics pipeline and increase latency.

Residency checks for texture blocks of arbitrary granularity can be performed in hardware, and therefore without the command/response overhead of software-based residency checks, by storing metadata that encodes compression parameters of a texture block and a residency status of the texture block. The metadata is stored in a GPU memory that is also used to store the texture block for access by a graphics pipeline implemented by the GPU. A shader in the graphics pipeline accesses the metadata for the texture block in conjunction with requesting the texture block to perform a shading operation. For example, the metadata can be accessed concurrently with requesting the texture block. If the metadata indicates that the texture block is resident in the GPU memory, the request for the data in the texture block is returned to the shader. Thus, no additional overhead is incurred by the residency check if the texture block is resident in the GPU memory. If the metadata indicates that the texture block is not resident in the GPU memory, a signal is fed back to the shader to indicate that the requested data is not resident in the GPU memory. The shader can populate the non-resident texture block (e.g., by loading the texture block from disk or procedurally generating the data for the texture block) in response to receiving the feedback. The shader can then re-access the metadata in conjunction (e.g., concurrently) with the texture block. The additional overhead required to perform the residency check in the event that the texture block is not resident in the GPU memory is minimal because it is performed in the flow of the sampling operation, e.g., in conjunction with or concurrently with attempting to access the texture block. Furthermore, the additional overhead relative to the overhead incurred by conventional texture requests is minimal because conventional texture requests are required to access metadata that indicates a compression ratio for the requested texture.

In some embodiments, a metadata cache stores metadata for texture blocks that are frequently accessed by the shader. The metadata cache can include information that indicates whether metadata accessed by the shader during a previous residency check indicated that the associated texture block was not resident in the GPU memory. Some embodiments of the metadata cache modify a residency status in response to some types of requests to access portions (e.g., tiles or cache lines) of the texture blocks. For example, the residency status of a tile can be changed to "non-resident, sampled" in response to a texture block fetch operation attempting to access metadata for a non-resident tile from the metadata cache. Metadata for non-resident tiles that are touched by sampling operations performed by a shader are therefore marked in the cached metadata, which is eventually written back to memory when the metadata cache evicts the modified metadata back to a global memory. Applications can read the metadata to locate non-resident, sampled tiles and populate the non-resident, sampled tiles with valid data, e.g., if the application expects to access the non-resident, sampled tiles in the future. For another example, the residency status of a tile can be changed to "resident" in response to texture data being written to a tile. In some embodiments, a metadata value that is used to indicate a compression ratio for compressed valid data that is written into a tile is used to represent the residency status of the tile. For example, metadata values can be encoded so that a first subset of the metadata values indicates an actual compression ratio for compressed valid data and that the residency status is "resident." A second subset of the metadata values indicates that the residency status is "non-resident, sampled" using a reserved bit pattern.

Figure 1:
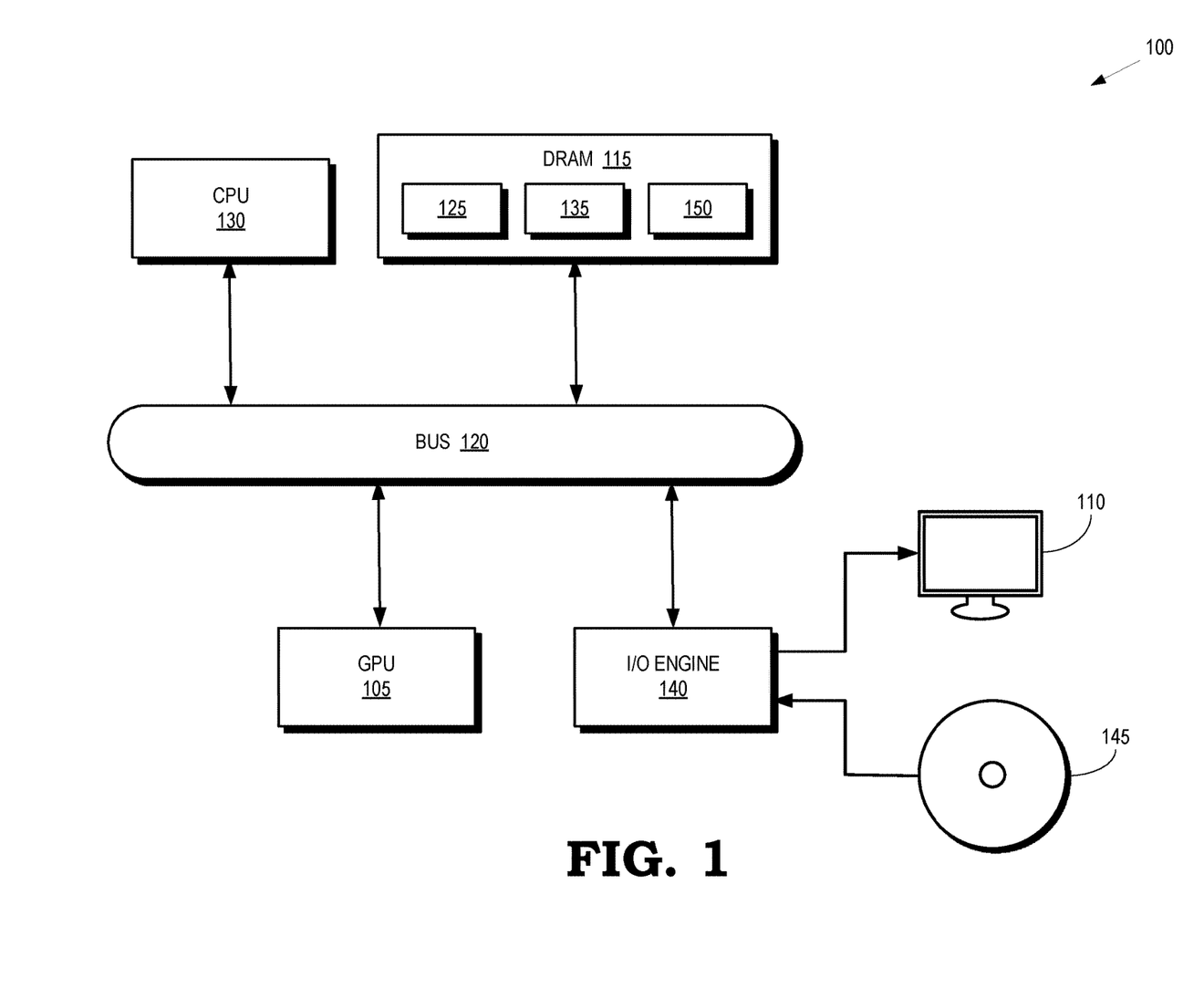
FIG. 1 is a block diagram of a processing system that includes a graphics processing unit (GPU) for creating visual images intended for output to a display according to some embodiments.

FIG. 1 is a block diagram of a processing system 100 that includes a graphics processing unit (GPU) 105 for creating visual images intended for output to a display 110 according to some embodiments. The processing system 100 includes a memory 115. Some embodiments of the memory 115 are implemented as a dynamic random access memory (DRAM). However, the memory 115 can also be implemented using other types of memory including static random access memory (SRAM), nonvolatile RAM, and the like. In the illustrated embodiment, the GPU 105 communicates with the memory 115 over a bus 120. However, some embodiments of the GPU 105 communicate with the memory 115 over a direct connection or via other buses, bridges, switches, routers, and the like. The GPU 105 can execute instructions stored in the memory 115 and the GPU 105 can store information in the memory 115 such as the results of the executed instructions. For example, the memory 115 can store a copy 125 of instructions from a program code that is to be executed by the GPU 105. Some embodiments of the GPU 105 include multiple processor cores (not shown in the interest of clarity) that can independently execute instructions concurrently or in parallel.

The processing system 100 includes a central processing unit (CPU) 130 for executing instructions. Some embodiments of the CPU 130 include multiple processor cores (not shown in the interest of clarity) that can independently execute instructions concurrently or in parallel. The CPU 130 is also connected to the bus 120 and can therefore communicate with the GPU 105 and the memory 115 via the bus 120. The CPU 130 can execute instructions such as program code 135 stored in the memory 115 and the CPU 130 can store information in the memory 115 such as the results of the executed instructions. The CPU 130 is also able to initiate graphics processing by issuing draw calls to the GPU 105. A draw call is a command that is generated by the CPU 130 and transmitted to the GPU 105 to instruct the GPU 105 render an object in a frame (or a portion of an object). Some embodiments of a draw call include information defining textures, states, shaders, rendering objects, buffers, and the like that are used by the GPU 105 to render the object or portion thereof. The information included in the draw call can be referred to as a state vector that includes state information. The GPU 105 renders the object to produce values of pixels that are provided to the display 110, which uses the pixel values to display an image that represents the rendered object.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 is able to communicate with the GPU 105, the memory 115, or the CPU 130. In the illustrated embodiment, the I/O engine 140 is configured to read information stored on an external storage medium 145, such as a compact disk (CD), a digital video disc (DVD), and the like.

The external storage medium 145 stores information representative of program code used to implement an application such as a video game. The program code on the external storage medium 145 can be written to the memory 115 to form the copy 125 of instructions that are to be executed by the GPU 105 or the CPU 130. The external storage medium 145 also stores information representative of textures that are used to render images for presentation on the display 110. Portions of the textures stored on the external storage medium 145 are written to the memory 115, which stores this information as the texture information 150. For example, the texture information 150 can include texture blocks and corresponding compression metadata that indicates a degree of compression applies to the texture blocks in the texture information 150.

The GPU 105 implements a graphics pipeline (not shown in FIG. 1 in the interest of clarity) that includes multiple stages configured for concurrent processing of different primitives or bins in response to a draw call. Stages of the graphics pipeline in the GPU 105 can concurrently process different primitives generated by an application, such as a video game. Processing of the primitives includes mapping textures to the primitives, e.g., to provide additional detail. The GPU 105 accesses texture data from the texture information 150 stored in the memory 115. However, as discussed herein, texture data for all of the texture blocks is not necessarily populated prior to the GPU 105 requesting access to the texture data. For example, texture data may not have been written from the external storage medium 145 to the memory 115. For another example, the CPU 130 may not have procedurally generated the texture data in accordance with instructions in the program code 135.

The GPU 105 determines whether texture data for a requested texture block is available in the texture information 150 by querying the metadata in conjunction with requesting access to the texture block stored in the texture information 150. As used herein, the phrase "in conjunction with" indicates that the GPU 105 issues a query of the metadata for each request to access a texture block. For example, the GPU 105 can query the metadata concurrently with requesting access to the texture block. For another example, the GPU 105 can query the metadata prior to requesting access to the texture block so that the residency status of the texture block can be determined and, if necessary, the texture block can be populated prior to the access request.

The metadata encodes a residency status of the texture block in addition to encoding the compression ratio for the texture block. For example, the metadata encodes information indicating whether the texture data in a texture block has been populated and is therefore available to the GPU 105 for texture mapping operations. The data in the texture block is selectively returned to the GPU 105 depending on whether the metadata indicates that the texture block is resident in the memory 115. For example, the memory 115 returns data in the texture block in response to the metadata indicating that the texture block is resident in the memory 115. For another example, a signal indicating that the requested data is not available is returned to the GPU 105 in response to the metadata indicating that the texture block is not resident in the memory 115. The GPU 105 can then populate data in the texture block in response to receiving the signal, either by causing the data to be written from the external storage medium 145 to the memory 115, by procedurally generating the data and storing it in the memory 115, or by causing the CPU 130 to procedurally generate the data and store it in the memory 115. The GPU 105 can subsequently re-access the metadata in conjunction with (e.g. concurrently with) re-requesting the texture block in response to populating the data in the texture block. Caching of the texture data and the metadata can also be performed, as discussed herein.

Figure 2:
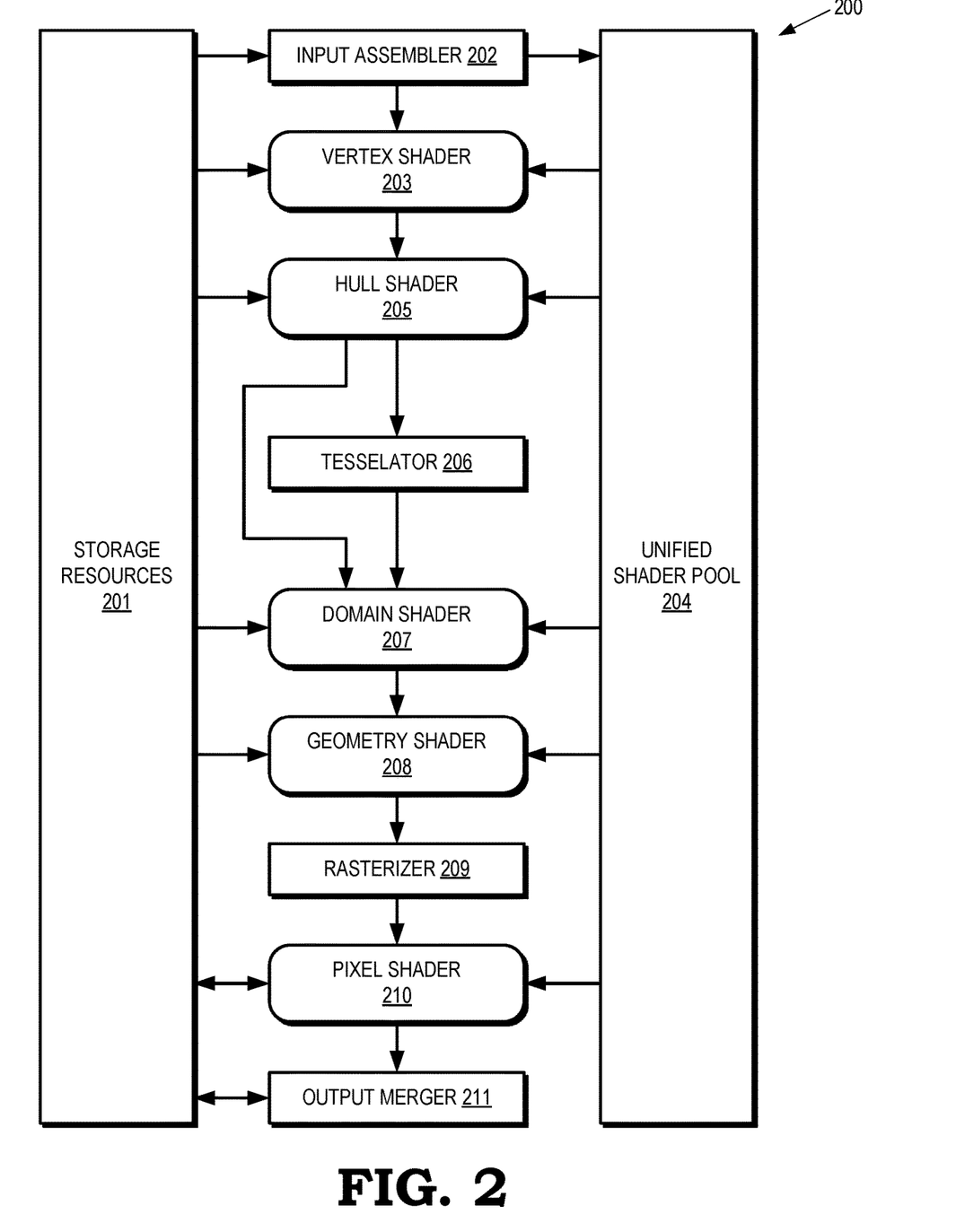
FIG. 2 depicts a graphics pipeline that is capable of processing high-order geometry primitives to generate rasterized images of three-dimensional (3-D) scenes at a predetermined resolution according to some embodiments.

FIG. 2 depicts a graphics pipeline 200 that is capable of processing high-order geometry primitives to generate rasterized images of three-dimensional (3-D) scenes at a predetermined resolution according to some embodiments. The graphics pipeline 200 is implemented in some embodiments of the GPU 105 shown in FIG. 1. The graphics pipeline 200 has access to storage resources 201 such as a hierarchy of one or more memories or caches that are used to implement buffers and store vertex data, texture data, and the like. The storage resources 201 can be implemented using some embodiments of the memory 115 shown in FIG. 1.

An input assembler 202 is configured to access information from the storage resources 201 that is used to define objects that represent portions of a model of a scene. A vertex shader 203, which can be implemented in software, logically receives a single vertex of a primitive as input and outputs a single vertex. Some embodiments of shaders such as the vertex shader 203 implement massive single-instruction-multiple-data (SIMD) processing so that multiple vertices can be processed concurrently. The graphics pipeline 200 shown in FIG. 2 implements a unified shader model so that all the shaders included in the graphics pipeline 200 have the same execution platform on the shared massive SIMD compute units. The shaders, including the vertex shader 203, are therefore implemented using a common set of resources that is referred to herein as the unified shader pool 204. Some embodiments of the unified shader pool 204 are implemented using processors in the GPU 105 shown in FIG. 1.

A hull shader 205 operates on input high-order patches or control points that are used to define the input patches. The hull shader 205 outputs tessellation factors and other patch data. Primitives generated by the hull shader 205 can optionally be provided to a tessellator 206. The tessellator 206 receives objects (such as patches) from the hull shader 205 and generates information identifying primitives corresponding to the input object, e.g., by tessellating the input objects based on tessellation factors provided to the tessellator 106 by the hull shader 205. Tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details can be added by tessellating the higher-order primitive.

A domain shader 207 inputs a domain location and (optionally) other patch data. The domain shader 207 operates on the provided information and generates a single vertex for output based on the input domain location and other information. A geometry shader 208 receives an input primitive and outputs up to four primitives that are generated by the geometry shader 208 based on the input primitive. One stream of primitives is provided to a rasterizer 209 and up to four streams of primitives can be concatenated to buffers in the storage resources 201. The rasterizer 209 performs shading operations and other operations such as clipping, perspective dividing, scissoring, and viewport selection, and the like. A pixel shader 210 inputs a pixel flow and outputs zero or another pixel flow in response to the input pixel flow. An output merger block 211 performs blend, depth, stencil, or other operations on pixels received from the pixel shader 210.

Some or all of the shaders in the graphics pipeline 200 can perform texture mapping using texture data that is stored in the storage resources 201. For example, the pixel shader 210 can read texture data from the storage resources 201 and use the texture data to shade one or more pixels. The shaded pixels are then provided to a display (such as the display 110 shown in FIG. 1) for presentation to a user. However, as discussed herein, the texture data is not necessarily populated to the storage resources 201 before the texture data is needed by the shaders in the graphics pipeline 200. Shaders such as the pixel shader 210 are therefore configured to access metadata in conjunction with (e.g., concurrently with) requesting the texture block to perform a shading operation. The metadata encodes compression ratios for the texture block and a residency status for the texture block. Data in the texture block is selectively returned to the shader depending on whether the metadata indicates that the texture block is resident in the storage resources 201.

Figure 3:
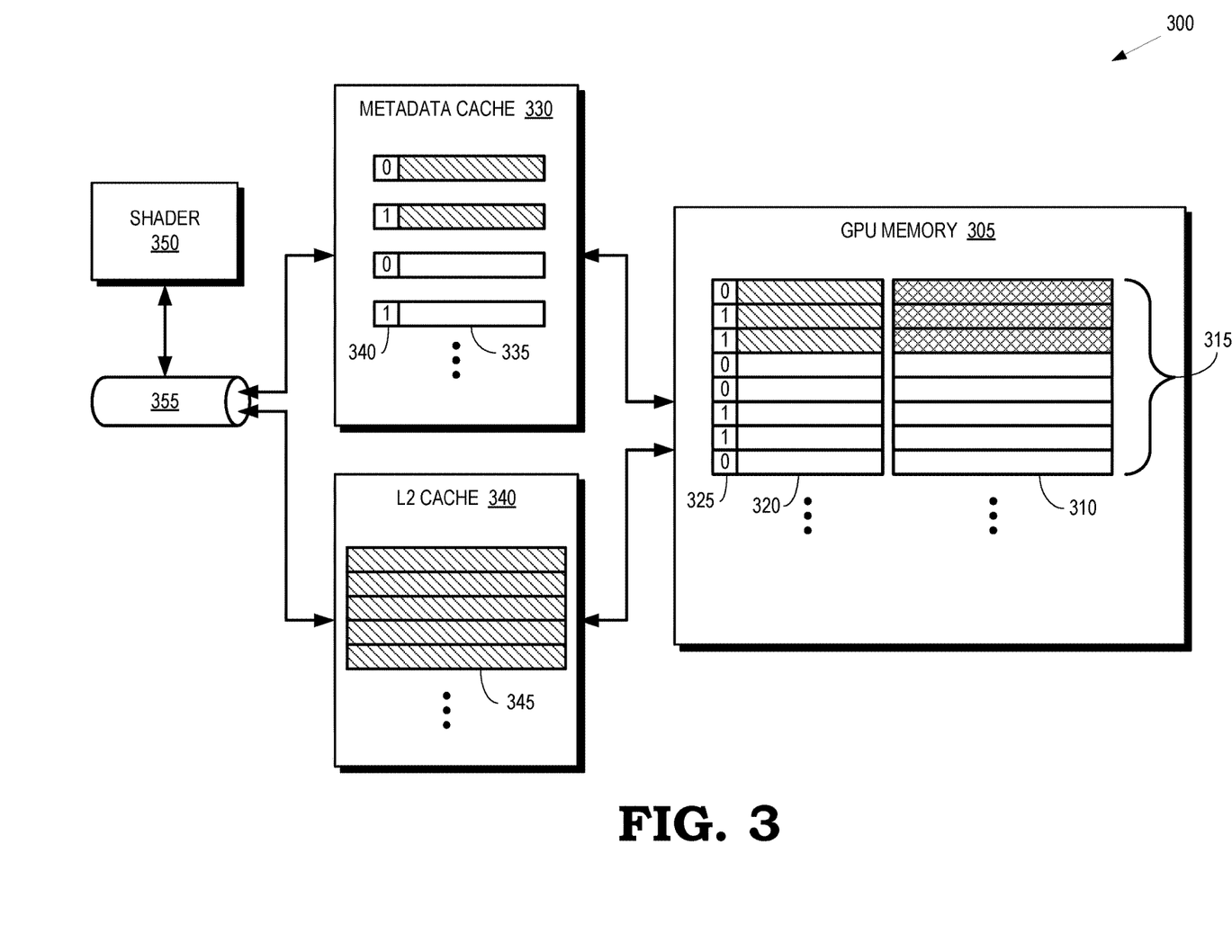
FIG. 3 is a block diagram of a memory structure that is used to store texture blocks and corresponding metadata according to some embodiments.

FIG. 3 is a block diagram of a memory structure 300 that is used to store texture blocks and corresponding metadata according to some embodiments. The memory structure 300 is implemented in some embodiments of the processing system 100 shown in FIG. 1 and the graphics pipeline 200 shown in FIG. 2. The memory structure 300 includes a GPU memory 305 that is used to store texture blocks 310 (only one indicated by a reference numeral in the interest of clarity). The GPU memory 305 is implemented using some embodiments of the memory 115 shown in FIG. 1 and the storage resources 201 shown in FIG. 2.

In the illustrated embodiment, the texture blocks 310 are subsets of a page 315 of texture information. For example, the page 315 can be implemented at a virtual machine page granularity, which could be set at a value within a range of 4-64 kB. The texture blocks 310 can be configured at an arbitrary granularity, such as $\frac{1}{8}$, $\frac{1}{16}$, or $\frac{1}{32}$ of the granularity of the page 315. For example, each of the texture blocks 310 can represent a cache line, a tile, or other subdivision of a virtual machine page. The GPU memory 305 also stores metadata 320 (only one indicated by a reference numeral in the interest of clarity) for corresponding texture blocks 310. The metadata 320 encodes a compression ratio used to compress the information in the corresponding texture block 310. For example, if texture data in the texture block 310 can be compressed at one of a set of seven compression ratios, the values of the compression ratios can be encoded using three bits.

Not all of the texture blocks 310 are populated with valid texture data. In the illustrated embodiment, texture blocks 310 that are populated with valid texture data are indicated by crosshatched boxes and texture blocks 310 that are not populated with valid texture data are indicated by open white boxes. The metadata 320 therefore includes a residency status to indicate whether valid texture data for the corresponding texture blocks 310 is resident in the GPU memory 305. In the illustrated embodiment, metadata 320 that include encoded information indicating that valid texture data is resident in the GPU memory 305 are indicated by crosshatched boxes and metadata 320 that include encoded information indicating that valid texture data is not resident in the GPU memory 305 are indicated by open white boxes. The metadata 320 can include a separate bit that is set to different values to indicate whether the texture data in the corresponding texture block 310 is resident in the GPU memory 305. For example, the bit can be set to a value of 1 to indicate that the texture data is resident and the bit can be set to a value of 0 to indicate that the texture data is not resident. The metadata 320 can also encode the residency status in combination with the compression ratios. For example, the three bits used to encode the seven possible compression ratios can also be used to encode the residency status if the seven values that indicate the compression ratios also indicate that the texture data for the texture block 310 is resident in the GPU memory 305. The eighth value indicates that the texture data for the texture block 310 is not resident in the GPU memory 305.

Some embodiments of the metadata 320 also store (or encode) information indicating a sampling status 325 of the metadata 320. The sampling status 325 indicates whether a previous residency check for the texture block 310 associated with the metadata 320 indicated that the texture block 310 was not resident in the GPU memory 305. For example, a value of the sampling status 325 equal to 0 indicates that no previous residency check indicated that the texture block 310 was not resident in the GPU memory 305 and a value equal to 1 indicates that at least one previous residency check indicated that the texture block 310 was not resident in the GPU memory 305. The sampling status 325 can be used to de-duplicate entries in task lists that applications generate for the tiles that should be populated with loaded or generated data. Although the sampling status 325 is indicated by a value of a bit in FIG. 3, some embodiments can encode the sampling status 325 using values of the bits used to represent the metadata 320.

The memory structure 300 includes a metadata cache 330 that is used to store frequently accessed metadata 330. The cached metadata 335 can be added to, or evicted from, the metadata cache 330 according to a cache replacement policy. The metadata 330 indicates the residency status of a corresponding texture block 310, e.g., crosshatching indicates that the texture data is resident in the GPU memory 305. The metadata cache also stores a sampling status 340 corresponding to the cached metadata 335. The sampling status 340 for the metadata 330 can be modified in response to requests to access the cached metadata 335. For example, if the value (or encoding) of the sampling status 340 is "non-sampled" when the sampling status 340 and the metadata 335 are added to the metadata cache 330, the sampling status 340 is changed to a "sampled" value (or encoding) in response to a first hit to the metadata 335. The sampling status 340 retains the "sampled" value (or encoding) in response to subsequent heads if the texture data for the corresponding texture block 310 remains non-resident in the GPU memory 305. In some embodiments, the texture data for the texture block 310 is populated in response to the sampling status having a "sampled" value and the residency status indicating that the texture data for the texture block 310 is not resident in the GPU memory 305. The populated texture data for the texture block 310 is therefore available for subsequent access requests. The sampling status is set to a "non-sampled" value and the residency status is set to resident in response to populating the texture data for the texture block 310.

Some embodiments of the memory structure 300 include a cache such as an L2 cache 340 that is used to store frequently accessed texture blocks 345 (only one indicated by a reference numeral in the interest of clarity). The cached texture blocks 345 are added to, or evicted from, the L2 cache 340 according to a cache replacement policy. For example, a least-recently-used cache replacement policy can be implemented by the L2 cache 340. In the illustrated embodiment, the cached texture blocks 345 are populated with valid texture data, as indicated by the crosshatching so that the L2 cache 340 is able to return valid texture data in response to a cache hit.

Shaders, such as the shader 350, are able to access metadata in conjunction with accessing corresponding texture blocks via a pipeline 355. For example, the shader 350 can access the metadata concurrently with accessing the corresponding texture blocks. In the illustrated embodiment, the shader 350 submits a texture request to the pipeline 355, which transforms the texture request into one or more concurrent texture data and metadata requests. For example, the pipeline 355 can generate a request that contains both a metadata address for a tile and data address for texture data within a tile. Some embodiments of the pipeline 355 implement an internal data cache to store frequently accessed copies of texture data that is also stored in the L2 cache 340 and the GPU memory 305. The pipeline 355 can therefore respond to some texture data requests by returning texture data stored in its internal data cache.

The pipeline 355 is configured to submit requests for the texture data to the L2 cache 340. If the request hits in the L2 cache 340, the requested texture data is returned to the pipeline 355 from the L2 cache 340. If the request misses in the L2 cache 340, the request is forwarded to the GPU memory 305. The query of the residency status of the texture data is submitted to the metadata cache 330. If the query hits in the metadata cache 330, the metadata cache 330 returns the metadata 330 to the pipeline 355, which uses the metadata 330 to determine the residency status, e.g., resident or non-resident, and the sampling status 340 of the texture data, e.g., previously sampled or not. As discussed herein, the residency status or the sampling status can be modified in response to the query. If the query misses in the metadata cache 330, the query is forwarded to the GPU memory 305.

In response to receiving a query for the residency status of a texture block 310, the GPU memory 305 returns the encoded metadata 320 to the pipeline 355, which uses the encoded metadata 320 to determine whether the texture data for the texture block 310 is resident or non-resident in the GPU memory 305. If the texture data is resident, the GPU memory 305 returns the requested texture data to the pipeline 355 in response to the request for the texture data in the texture block 310.

The pipeline 355 receives the requested texture data and the requested metadata from the metadata cache 330 or the GPU memory 305. The pipeline 355 can translate this information and return the translated information to the shader 350. For example, the pipeline 355 uses the metadata to determine whether the requested texture data is resident in the GPU memory 305. If so, the pipeline 355 returns the requested texture data to the shader 350. If the metadata indicates that the requested texture data is not resident in the GPU memory 305, the pipeline 355 returns a signal indicating that the requested texture data is not resident in the GPU memory 305. If the requested texture data is returned, the shader 350 proceeds with processing using the requested texture data. If the shader 350 receives a signal indicating that the requested texture data is not resident in the GPU memory 305, the shader 350 can issue instructions to populate the texture block 310 with valid texture data in response to receiving the signal. The shader 350 can subsequently resubmit the request for texture data and the query of the metadata for the texture block 310.

Figure 4:
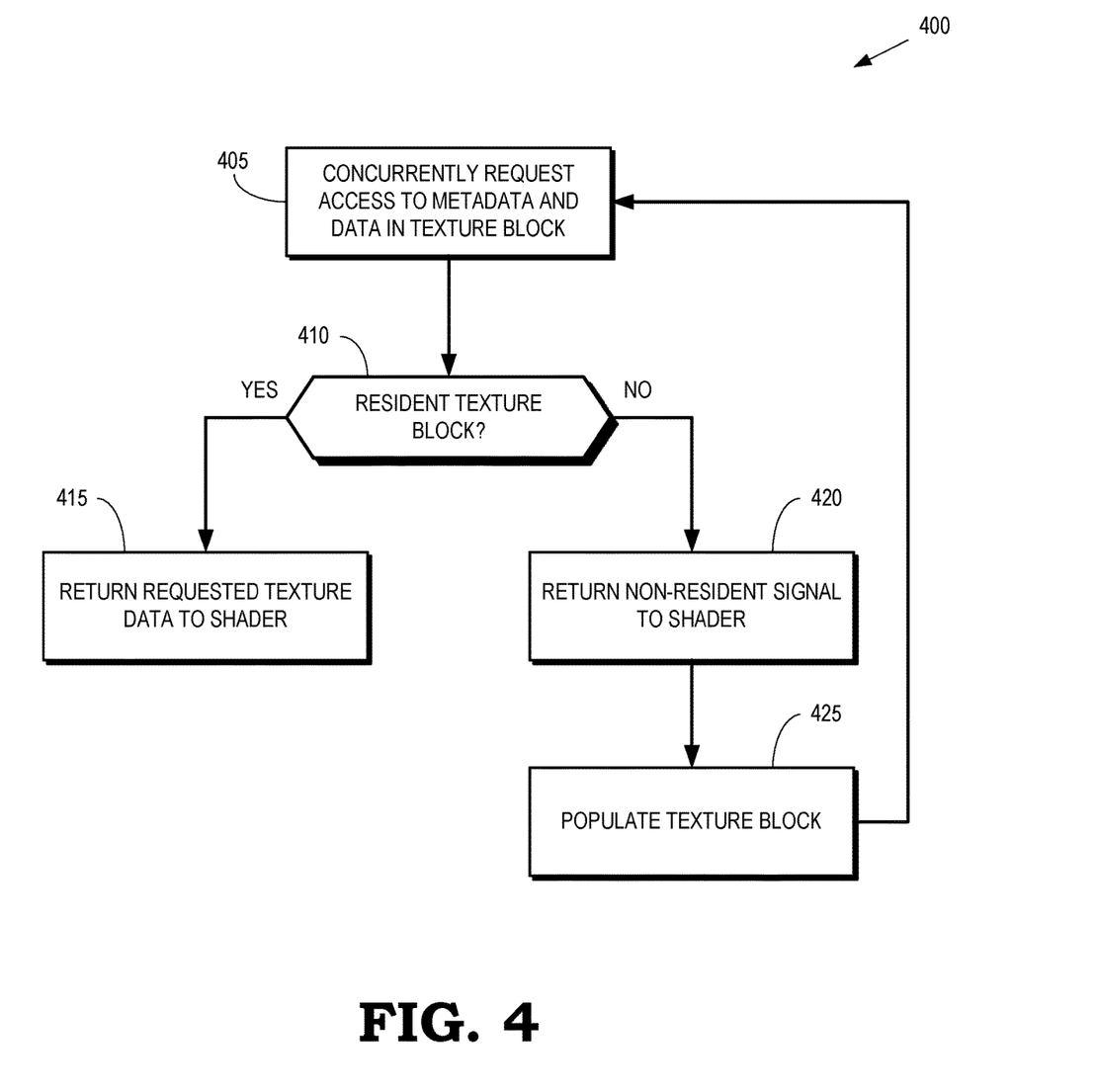
FIG. 4 is a flow diagram of a method for selectively returning texture data based on a residency status of a texture block that includes the texture data according to some embodiments.

FIG. 4 is a flow diagram of a method 400 for selectively returning texture data based on a residency status of a texture block that includes the texture data according to some embodiments. The method is implemented in some embodiments of the processing system 100 shown in FIG. 1, the graphics pipeline 200 shown in FIG. 2, and the memory structure 300 shown in FIG. 3.

At block 405, a shader submits requests to concurrently access metadata and texture data for a texture block that is stored in a memory. As discussed herein, the texture data is not necessarily populated prior to the shader submitting the request. The metadata therefore encodes a residency status for the texture data to indicate whether the texture data is resident or non-resident in the memory. Thus, the metadata access is used to determine the residency status of the texture data concurrently with the request to access the texture data being used to retrieve the texture data from a cache or the memory. The metadata is also used to determine compression ratios of the texture data.

At decision block 410, the residency status of the texture data for the texture block is determined. For example, the residency status of the texture data is determined to be "resident" if the encoded metadata has a value that corresponds to resident texture data. The residency status of the texture data is determined to be "non-resident" if the encoded metadata has a value that indicates that the texture data is not resident in the memory. If the texture data is resident in the memory, the method flows to block 415. If the texture data is not resident in the memory, the method flows to block 420.

At block 415, the requested texture data is returned to the shader. As discussed herein, the resident texture data can be returned to the shader from a memory such as the GPU memory 305 or a corresponding cache such as the L2 cache 340 shown in FIG. 3.

At block 420, a signal indicating that the requested texture data is not resident in the memory is returned to the shader. In response to receiving the signal, the shader issues instructions to populate (at block 425) the texture block with the requested texture data. The method 400 then flows to block 405 and the shader resubmits the concurrent requests to access the metadata and the texture data in the texture block. The texture data should be resident in the memory at this point. However, if the texture data is still not resident in the memory, the method 400 can iterate until the shader successfully retrieves the requested texture data from the memory.

Figure 5:
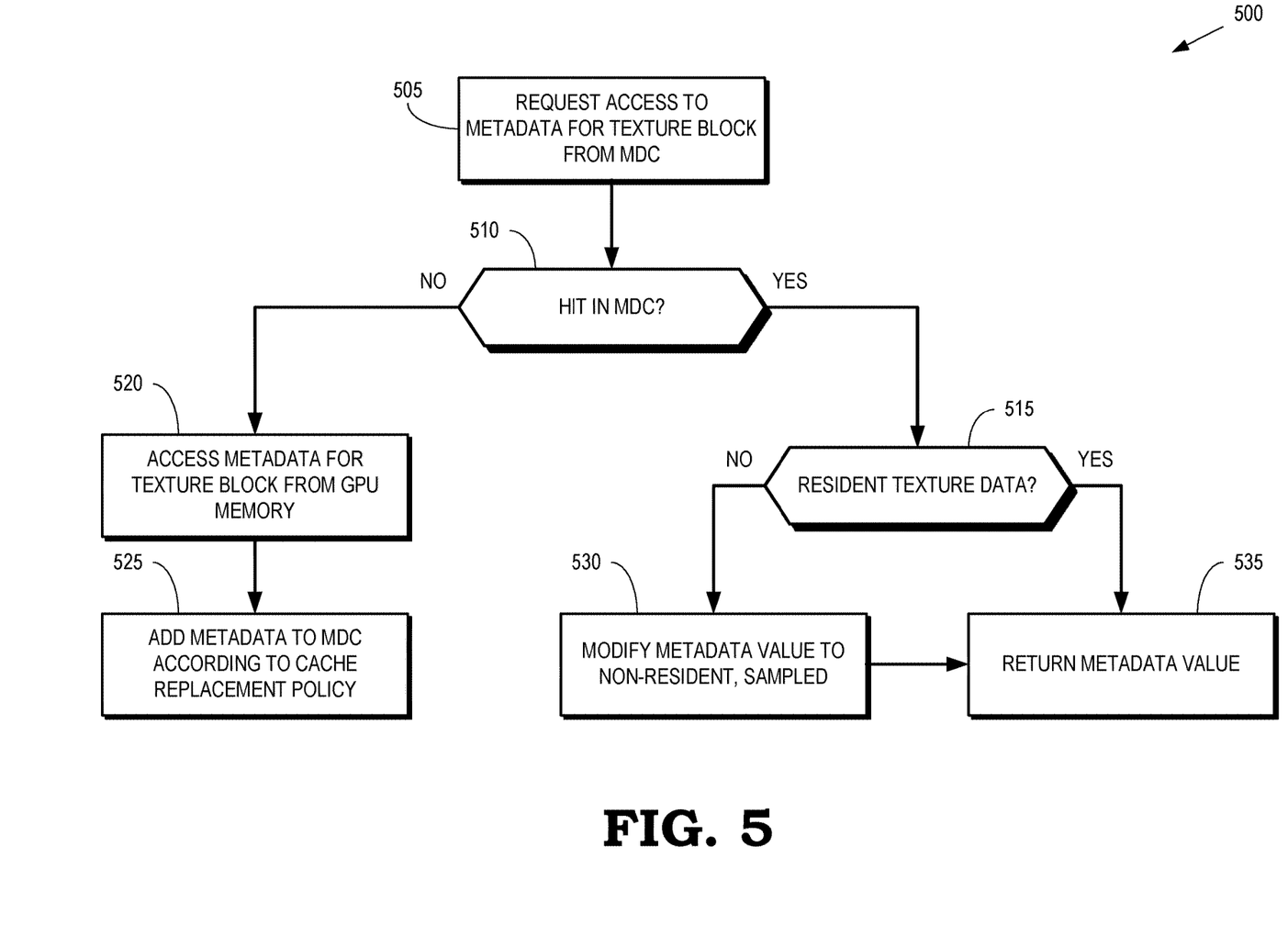
FIG. 5 is a flow diagram of a method of operating a metadata cache associated with a GPU memory according to some embodiments.

FIG. 5 is a flow diagram of a method 500 of operating a metadata cache associated with a GPU memory according to some embodiments. The method 500 is implemented in some embodiments of the metadata cache 330 and the GPU memory 305 shown in FIG. 3.

At block 505, a request is issued to the metadata cache for access to metadata for texture block. For example, the request can include metadata address of a tile. At decision block 510, the metadata cache determines whether the request hits in the metadata cache, e.g., by comparing a portion of the metadata address to a tag array in the metadata cache. If the request hits in the metadata cache, the method flows to decision block 515. If the request misses in the metadata cache, the method flows to block 520.

At block 520, the request for the metadata is forwarded to the GPU memory and the requested metadata is accessed from the GPU memory. As discussed herein, the requested metadata can be used to determine a compression ratio and a residency status of corresponding texture data. At block 525, the metadata that is retrieved from the GPU memory is cached in the metadata cache according to a cache replacement policy. For example, a least-recently-used cache entry can be evicted from the metadata cache and replaced with the retrieved metadata.

At decision block 515, the metadata is used to determine whether the requested texture data is resident in the GPU memory. For example, a pipeline such as the pipeline 355 shown in FIG. 3 can translate the metadata to determine whether the requested texture data is resident or non-resident. If the texture data is not resident in the memory, the method 500 flows to the block 530. If the texture data is resident in the memory, the method 500 flows to the block 535.

At block 530, a sampling status of the cached metadata is modified to "sampled" to indicate that the previously cached metadata has been sampled by in other access request. The sampling status of the cached metadata can be used to de-duplicate task lists in some embodiments. The method 500 then flows from the block 530 to the block 535. At block 535, the cached metadata value is returned. For example, the cached metadata values can be returned to the pipeline, which translates the cached metadata value and provides the shader with either the requested texture data or the signal indicating that the requested texture data is not resident in the memory.

Figure 6:
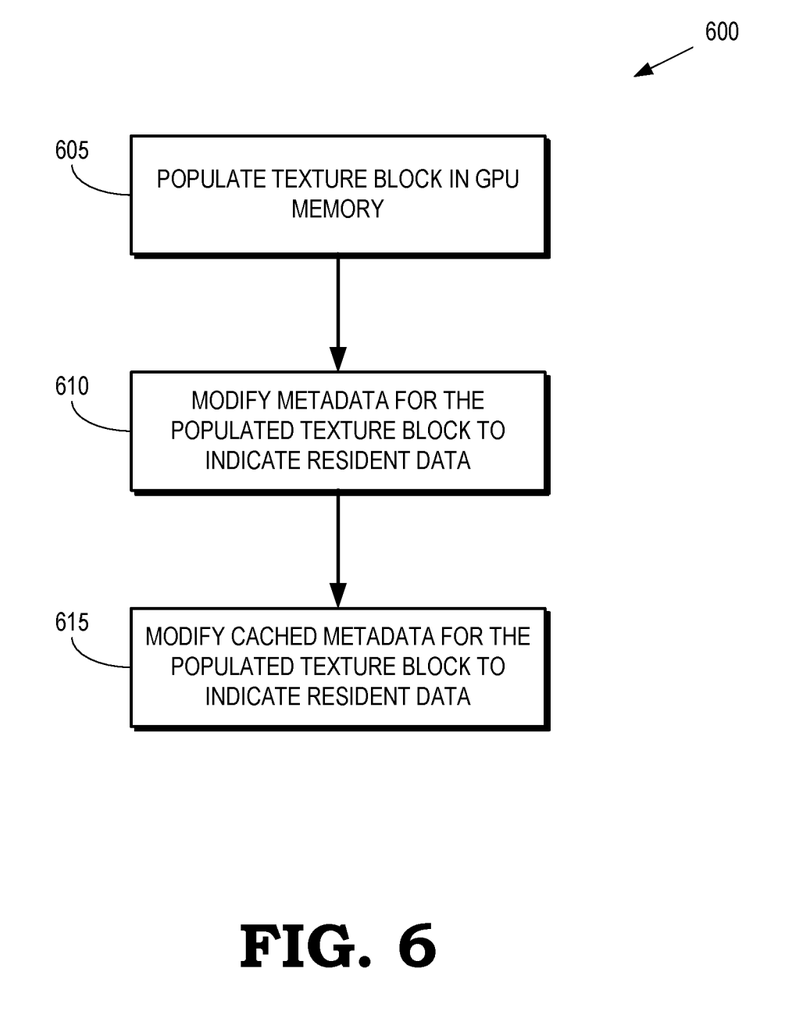
FIG. 6 is a flow diagram of a method for populating texture data in the GPU memory and an associated cache according to some embodiments.

FIG. 6 is a flow diagram of a method 600 for populating texture data in the GPU memory and an associated cache according to some embodiments. The method 600 is implemented in some embodiments of the memory structure 300 shown in FIG. 3. For example, the method 600 can be implemented in response to a request from the shader 350 to populate non-resident texture data in the texture blocks 310 shown in FIG. 3.

At block 605, texture data for a texture block in the GPU memory is populated. For example, the texture data can be populated by retrieving the texture data from a disk such as the storage medium 145 shown in FIG. 1. The texture data can also be populated by procedurally generating the texture data. For example, the CPU 130 can execute instructions in the copy 125 of the program code to procedurally generate texture data for the texture block in the GPU memory.

At block 610, metadata for the populated texture block is modified to indicate that the texture data is resident in the GPU memory. For example, values of the metadata that encodes a compression ratio of the texture data and the residency status of the texture data can be modified to indicate the compression ratio and the "resident" residency status of the texture data. If the metadata for the texture block was previously cached in a metadata cache, the entry in the metadata cache is modified (at block 615) to indicate new residency status of the texture block. For example, a cache coherency protocol can be used to modify the cached value of the encoded metadata.

Figure 7:
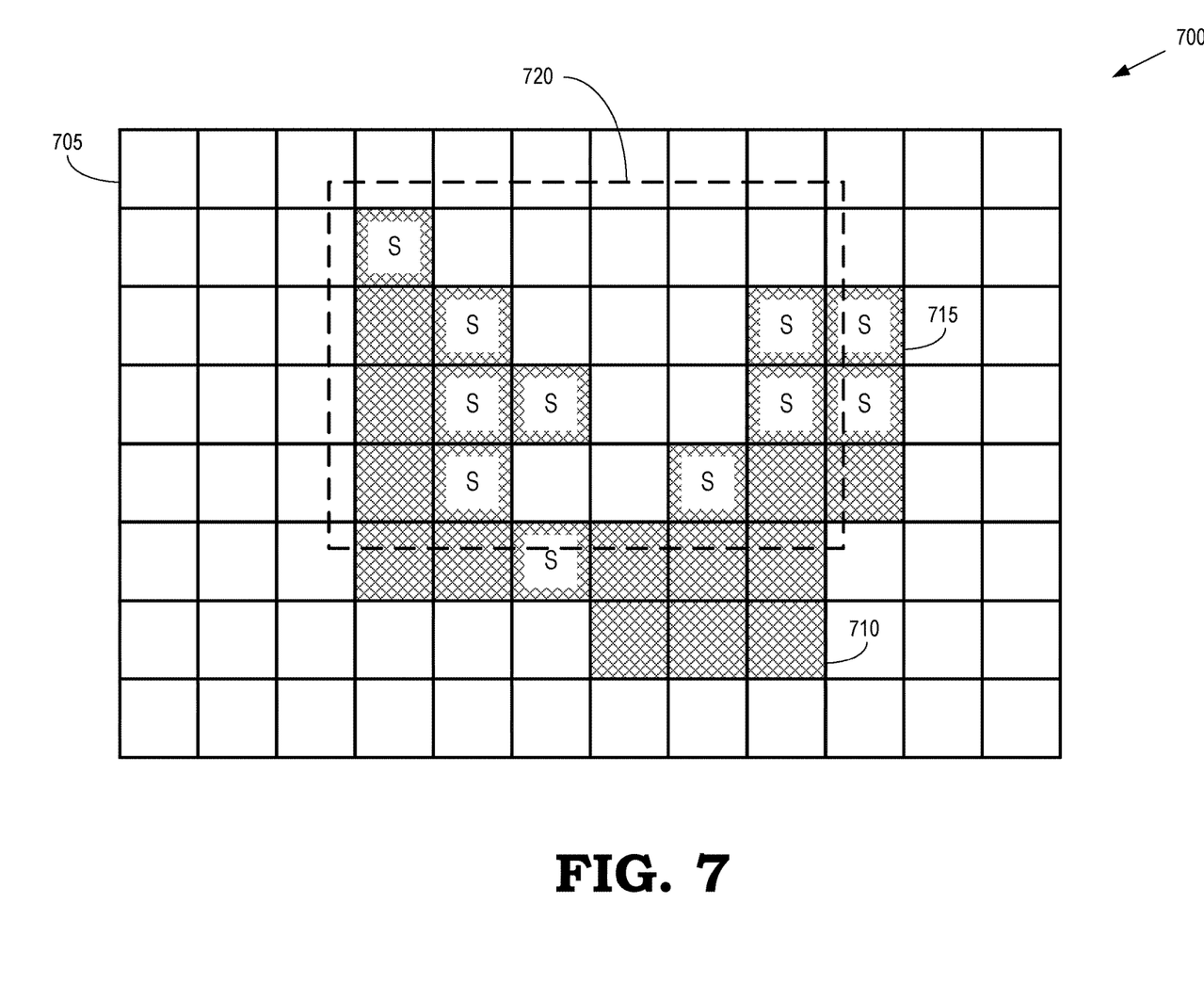
FIG. 7 is a block diagram of a metadata surface associated with a texture block according to some embodiments.

FIG. 7 is a block diagram of a metadata surface 700 associated with a texture block according to some embodiments. The metadata surface 700 includes entries 705 (only one indicated by a reference numeral in the interest of clarity) that indicate a compression ratio used for a corresponding portion (such as a tile) of a texture, as well as a residency status of the tile. The metadata surface 700 can therefore represent some embodiments of the metadata 320 for corresponding texture blocks 310 shown in FIG. 3. Tiles that are resident in the memory are indicated by cross-hatched entries 710 (only one indicated by a reference numeral in the interest of clarity) and resident tiles 715 that have been previously sampled are further indicated by the letter "S." as discussed herein, the residency status and sampling status can be indicated by different subsets of bits or they can be encoded into the same set of bits.

The residency status or the sampling status of the tiles can be determined by sampling portions of the metadata surface 700. For example, a shader can sample the entries 705, 710, 715 within a sampling footprint 720 to determine a residency status or a sampling status of the corresponding tile in the texture associated with the metadata surface 700. In some embodiments, the shader checks the residency status of the tiles within the sampling footprint 720 without requesting the texture data for the tile. Checking the residency status of the tiles can be performed in conjunction with accessing texture data from the tiles. For example, the shader can generate a worklist of tiles that are to be processed during a separate pass using feedback that indicates the non-resident tiles in the texture. The non-resident tiles in the work list can then be populated with valid data during the separate pass. The shader performs texture data sampling on the tiles, which have been populated with valid data and therefore do not require an additional access to the metadata surface 700. In some embodiments, the shader runs a check operation that changes the sampling status for the tiles. For example, if the check operation is performed on the tiles within the sampling footprint 720, the sampling status of the entries in the portion of the metadata within the sampling footprint 720 is changed to "sampled" in response to the check operation. In a separate pass, the shader read back the metadata surface 700 and identifies entries that are "non-resident" and "sampled." The non-resident, sampled tiles are then populated with valid data. This approach addresses the de-duplication problem because the shader only accesses the sampling status during the metadata inspection pass, regardless of the number of sampling accesses for a tile during one or more previous passes.

Figure 8:
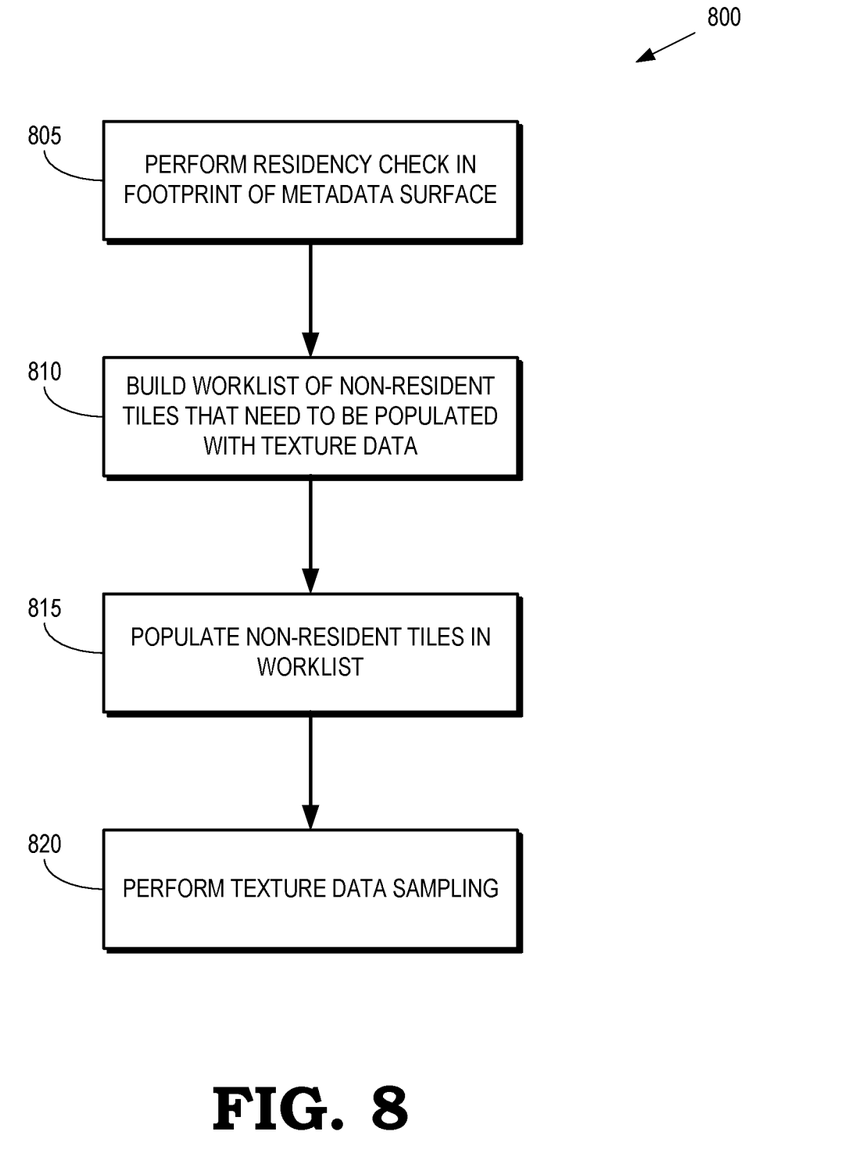
FIG. 8 is a flow diagram of a method of generating a worklist of non-resident tiles by sampling a metadata surface according to some embodiments.

FIG. 8 is a flow diagram of a method 800 of generating a worklist of non-resident tiles by sampling a metadata surface according to some embodiments. The method 800 is implemented using some embodiments of the metadata surface 700 shown in FIG. 7 and the method 800 can be implemented in some embodiments of the processing system 100 shown in FIG. 1 and the graphics pipeline 200 shown in FIG. 2.

At block 805, in a first pass, a shader performs a residency check by sampling metadata within a sampling footprint of a metadata surface. For example, the shader can check the residency status encoded in metadata entries for corresponding portions or tiles of a texture. As discussed herein, the residency status indicates whether a GPU memory contains texture data for the corresponding portions or tiles. Texture data is not returned to the shader in response to the residency check.

At block 810, the shader builds a worklist that includes non-resident tiles that need to be populated with texture data. For example, the shader can identify the non-resident tiles based on the residency status encoded in the metadata. The shader can then generate a worklist that includes identifiers or addresses of the tiles that have not been populated with texture data. The worklist can be stored for subsequent access after completing a pass through the metadata entries within the sampling footprint.

At block 815, the shader uses the information in the worklist to populate the non-resident tiles. For example, the shader can retrieve the worklist and then retrieve or procedurally generate texture data based on the information in the worklist.

At block 820, in a second pass, the shader can perform texture data sampling to retrieve texture data from the tiles in the texture. The texture data should be available in the GPU memory so that the shader is able to retrieve the texture data during the pass. The texture data sampling is therefore performed in conjunction with the residency check performed by sampling the metadata.

Figure 9:
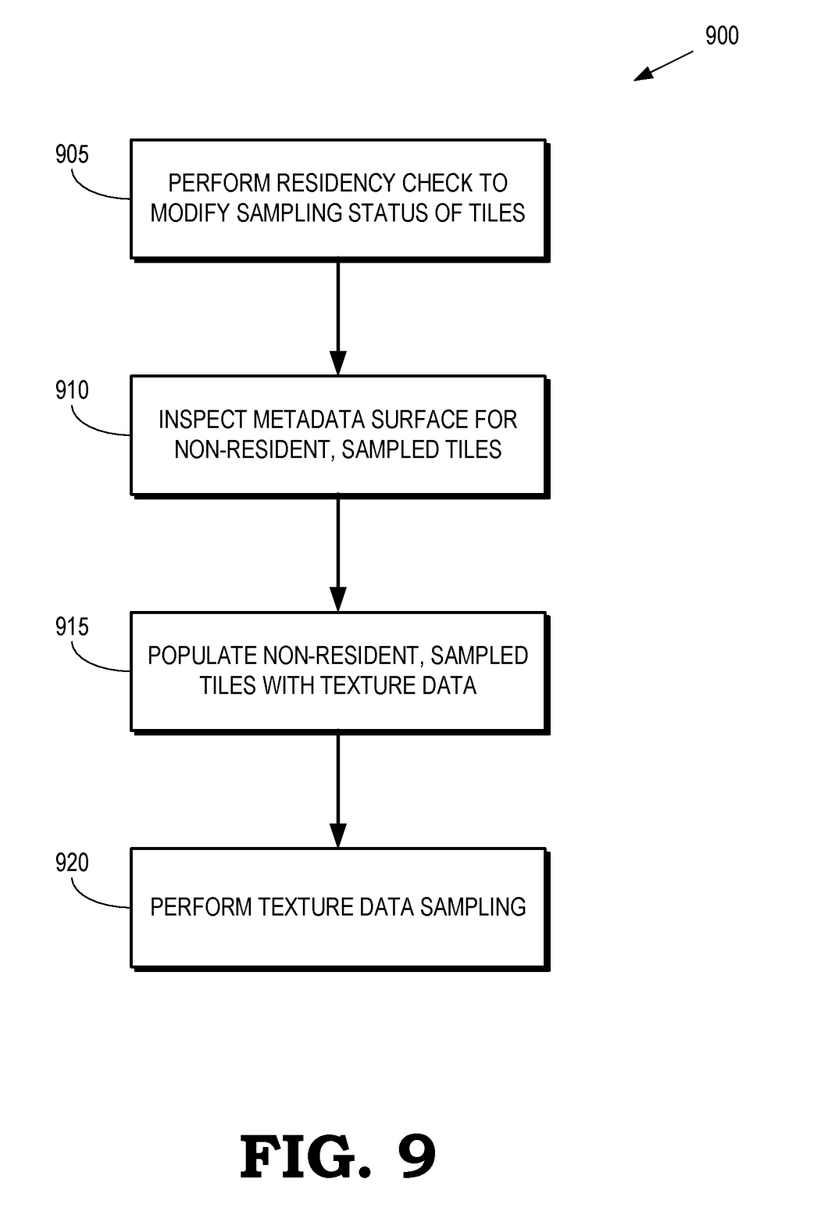
FIG. 9 is a flow diagram of a method of populating non-resident, previously sampled tiles with texture data according to some embodiments.

FIG. 9 is a flow diagram of a method 900 of populating non-resident, previously sampled tiles with texture data according to some embodiments. The method 900 is implemented using some embodiments of the metadata surface 700 shown in FIG. 7 and the method 900 can be implemented in some embodiments of the processing system 100 shown in FIG. 1 and the graphics pipeline 200 shown in FIG. 2.

At block 905, in a first pass through the metadata surface, a shader performs a residency check to modify a sampling status of one or more tiles. Some embodiments of the shader can perform the residency check by sampling metadata within a sampling footprint of the metadata surface. The sampling status of non-resident tiles that have not been previously sampled is changed from "not sampled" to "sampled," e.g., by changing bit values or encodings of entries in the metadata surface. However, the residency check performed at block 905 does not return any feedback to the shader. As discussed herein, the residency status indicates whether a GPU memory contains texture data for the corresponding portions or tiles.

At block 910, in a second pass, the shader reads back the entries in the metadata surface and inspects the entries to identify non-resident, sampled tiles. At block 915, the shader populates the non-resident, sampled tiles. For example, the shader can retrieve or procedurally generate texture data for the non-resident, sampled tiles. At block 920, the shader performs texture data sampling on the tiles stored in the GPU memory to retrieve the texture data. The shader therefore performs the texture data sampling in conjunction with checking the residency status of the tiles.

In some embodiments, the apparatus and techniques described above are implemented in a system comprising one or more integrated circuit (IC) devices (also referred to as integrated circuit packages or microchips), such as the graphics processing system described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a pipeline configured to access a memory that stores a page of texture information that includes a plurality of texture blocks and to access a cache that stores data that is accessed from the memory, wherein the memory also stores metadata that encodes compression parameters of the plurality of texture blocks and a plurality of residency statuses of the plurality of texture blocks, wherein the plurality of residency statuses indicates that a first subset of the plurality of texture blocks is resident in the memory and a second subset of the plurality of texture blocks is not resident in the memory; and
a processor to request access to the metadata in conjunction with requesting data in one of the plurality of texture blocks to perform a shading operation, wherein the pipeline selectively returns the data in the one of the plurality of texture blocks to the processor depending on whether the one of the plurality of texture blocks is in the first subset or the second subset.

2. The apparatus of claim 1, wherein the pipeline returns the data in the one of the plurality of texture blocks in response to the plurality of residency statuses indicating that the texture block is in the first subset.

3. The apparatus of claim 1, wherein the processor receives a signal indicating that the requested data is not available in response to the plurality of residency statuses indicating that the one of the plurality of texture blocks is in the second subset, populates data in the one of the plurality of texture blocks in response to receiving the signal, and re-accesses the metadata in conjunction with re-requesting the one of the plurality of texture blocks in response to populating the data in the one of the plurality of texture blocks.

4. The apparatus of claim 1, wherein the processor determines at least one of the plurality of residency statuses of the plurality of texture blocks during a first pass of a metadata surface that includes the metadata, selectively populates the plurality of texture blocks based on the at least one of the plurality residency statuses or a plurality of sampling statuses for the plurality of texture blocks, and samples texture data in the plurality of texture blocks during a second pass.

5. The apparatus of claim 1, wherein the cache comprises an entry to store a copy of the metadata that encodes the compression parameters and the plurality of residency statuses of the plurality of texture blocks.

6. The apparatus of claim 5, wherein a sampling status of the metadata stored in the cache indicates whether a previous residency check for the one of the plurality of texture blocks indicated that the one of the plurality of texture blocks was in the second subset.

7. The apparatus of claim 6, wherein the sampling status is modified in response to requests to access the metadata stored in the entry of the cache.

8. The apparatus of claim 7, wherein the processor populates data in the one of the plurality of texture blocks in response to a corresponding residency status indicating that the one of the plurality of texture blocks is in the second subset and the sampling status indicating that the cache has received at least one previous request to access the metadata in the entry.

9. A method comprising:
requesting access to data for a texture block stored in a memory in conjunction with accessing metadata, wherein the memory is associated with a cache that stores data that is accessed from the memory, wherein the texture block is in a page of texture information that includes a plurality of texture blocks and wherein the metadata encodes compression parameters for a plurality of residency statuses of the plurality of texture blocks, and wherein the plurality of residency statuses indicates that a first subset of the plurality of texture blocks is resident in the memory and a second subset of the plurality of texture blocks is not resident in the memory; and
selectively receiving data in one of the plurality of texture blocks depending on whether the residency status indicates that one of the plurality of texture blocks is in the first subset or the second subset.

10. The method of claim 9, wherein selectively receiving the data in the one of the plurality of texture blocks comprises receiving the data in the one of the plurality of texture blocks in response to a corresponding one of the plurality of residency statuses indicating that the one of the plurality of texture blocks is in the first subset.

11. The method of claim 9, wherein selectively receiving the data comprises receiving a signal indicating that the requested data is not available in response to the plurality of residency statuses indicating that the texture block is in the second subset, and further comprising:
populating data in the one of the plurality of texture blocks in response to receiving the signal; and
re-accessing the metadata in conjunction with re-requesting the data in the one of the plurality of texture blocks in response to populating the data in the one of the plurality of texture blocks.

12. The method of claim 9, further comprising:
determining at least one of the plurality of residency statuses or a sampling status of the plurality of texture blocks during a first pass of a metadata surface that includes the metadata;
selectively populating the plurality of texture blocks based on the at least one of the plurality of residency statuses or the sampling status; and
sampling texture data in the plurality of texture blocks during a second pass.

13. The method of claim 9, further comprising:
caching, in the cache, a copy of the metadata that encodes the compression parameters and the plurality of residency statuses of the one of the plurality of texture blocks.

14. The method of claim 13, wherein a sampling status of the metadata stored in the cache indicates whether a previous residency check for the one of the plurality of texture blocks indicated that the one of the plurality of texture blocks is in the second subset.

15. The method of claim 14, further comprising:
modifying the sampling status in response to requests to access the copy of the metadata.

16. The method of claim 15, further comprising:
populating data in the one of the plurality of texture blocks in response to the plurality of residency statuses indicating that the one of the plurality of texture blocks is in the second subset and the sampling status indicating that the cache has received at least one previous request to access the copy of the metadata.

17. A graphics processing unit comprising:
a graphics pipeline comprising a plurality of shaders; and
storage resources to store a plurality of texture blocks and metadata that encodes compression parameters of the plurality of texture blocks and a plurality of residency statuses that indicates that a first subset of the plurality of texture blocks is resident in a memory and a second subset of the plurality of texture blocks is not resident in the memory,
wherein the memory is associated with a cache that stores data that is accessed from the memory,
wherein a shader of the plurality of shaders is configured to access the metadata in conjunction with requesting the texture block to perform a shading operation, and
wherein data in one of the plurality of texture blocks is selectively returned to the shader depending on whether the residency status indicates that the one of the plurality of texture blocks is in the first subset or the second subset.

18. The graphics processing unit of claim 17, wherein the data in the one of the plurality of texture blocks is returned to the shader in response to the plurality of residency statuses indicating that the one of the plurality of texture blocks is resident in the storage resources.

19. The graphics processing unit of claim 17, wherein the shader receives a signal indicating that the data is not available in response to the plurality of residency statuses indicating that the texture block is in the second subset.

20. The graphics processing unit of claim 19, wherein the shader populates data in the one of the plurality of texture blocks in response to receiving the signal, and wherein the shader re-accesses the metadata in conjunction with re-requesting the one of the plurality of texture blocks in response to populating the data in the one of the plurality of texture blocks.

* * * * *